United States Patent
Meinig

[11] Patent Number: 6,109,665
[45] Date of Patent: Aug. 29, 2000

[54] BUTT JOINT OF AIR DUCT SECTIONS

[75] Inventor: Manfred Meinig, Reitheim-Weilheim, Germany

[73] Assignee: METU-System Meining KG, Rietheim-Weilheim, Germany

[21] Appl. No.: 09/077,820

[22] PCT Filed: Dec. 14, 1996

[86] PCT No.: PCT/DE96/02430

§ 371 Date: Aug. 12, 1998

§ 102(e) Date: Aug. 12, 1998

[87] PCT Pub. No.: WO97/23743

PCT Pub. Date: Jul. 3, 1997

[30] Foreign Application Priority Data

Dec. 21, 1995 [DE] Germany .......................... 195 47 982

[51] Int. Cl.[7] .................................................. F16L 23/00
[52] U.S. Cl. .......................... 285/405; 285/365; 285/424
[58] Field of Search .................................... 285/405, 424, 285/406, 407, 409, 410, 364, 365; 138/DIG. 4, 171, 163

[56] References Cited

U.S. PATENT DOCUMENTS

| | | | |
|---|---|---|---|
| 1,220,774 | 3/1917 | Murray | 138/171 X |
| 1,542,663 | 6/1925 | Brenzinger | 138/171 |
| 1,857,505 | 5/1932 | Heineman | 138/171 X |
| 3,674,291 | 7/1972 | Goldberg | 285/367 |
| 4,679,832 | 7/1987 | Meinig | 285/414 |
| 4,822,093 | 4/1989 | Meinig | 285/424 X |
| 4,867,490 | 9/1989 | Arnoldt | 285/424 X |
| 4,881,762 | 11/1989 | Arnoldt | 285/424 X |
| 4,941,693 | 7/1990 | Spaude et al. | 285/424 X |

FOREIGN PATENT DOCUMENTS

| | | | |
|---|---|---|---|
| 646615 | 8/1962 | Canada | 285/363 |
| 743452 | 9/1966 | Canada | 285/363 |
| 0 197 446 B1 | 10/1986 | European Pat. Off. | |
| 0 287 755 A1 | 10/1988 | European Pat. Off. | |
| 35 37 504 C1 | 2/1987 | Germany | |
| 37 13461 C2 | 11/1988 | Germany | |
| 39 01 394 A1 | 7/1990 | Germany | |
| 40 23 470 C2 | 8/1991 | Germany | |
| 43 08 013 A1 | 9/1992 | Germany | |
| 137616 | 9/1979 | Netherlands | 285/424 |
| WO 94/21971 | 9/1994 | United Kingdom | |

Primary Examiner—Lynne H. Browne
Assistant Examiner—David E. Bochna
Attorney, Agent, or Firm—Nath & Associates; Gary M. Nath; Harold L. Novick

[57] ABSTRACT

The invention relates to a butt joint between two circular or flat, oval air duct sections (10) each with a connection flange (32) at each end and a ring (34) clamping the connection flanges together. Said connection flanges (34) are moulded, to form one part, to the duct wall (12) of each air duct section (10) and each have an outwardly-projecting annular edge (14) and clamping legs (24) drawn together by corresponding side legs (38) of the clamping ring (34). Each annular edge (14) forms an angle of 80° to 90°, preferably 87° to 89°, with the associated duct wall (12). Each connection flange (32) can also have another or a plurality of supporting legs (28).

6 Claims, 6 Drawing Sheets

BUTT JOINT OF AIR DUCT SECTIONS

FIELD OF THE INVENTION

The invention relates to a butt joint between two sheet metal air duct sections according to the preamble of claim 1.

BACKGROUND OF THE INVENTION

Circular and flat oval air ducts for ventilation, climate control, suction, chip and fiber transport are usually composed of straight air duct sections and shaped pieces. Straight air duct sections are currently manufactured for the most part as folded spiral-seam pipes, and less often as side-seam pipes. Folded spiral-seam pipes are folded from a sheet metal band whose edges are folded together. Since manufacturing is fully automatic and very quick, folded spiral-seam pipes are very reasonably priced. Side-seam pipes are mostly manufactured manually and are therefore somewhat more expensive. They are used primarily in cases where the spiral seam would interfere for various reasons. Shaped pieces (bends, T/pieces, branch-offs, transitions, etc.) are used between the straight duct sections.

Various types of connection are used to connect duct sections and shaped pieces to form a continuous air duct. So-called plug-in connections are used for smaller pipe cross sections, while larger pipe cross sections are connected primarily with connection flanges located at the ends of each duct section. In known butt joints of this type, the connection flanges are crimped, riveted, point-welded or attached with self-cutting screws to the ends of each air duct section. As required, the contact site between connection flange and duct wall must be sealed. This also requires an exact centering of the abutting duct sections.

Because of this, the manufacture of these known butt joints is rather complex. Annular connection flanges must be produced and attached at each duct section, as well as sealed and centered. For plug-in connections, the expenditure is somewhat smaller during manufacture, but greater during installation. The known air ducts also have significant problems with regard to sealing and interference with the air flow in the duct due to projections and projecting parts inside the duct, and also as a result of not being centered. Especially during suction and during the transport of dust, chips, fibers, etc., the sheet metal edges, gaps, and projections inside the duct result in accumulations that can build up and obstruct the duct. When transporting room air, such an accumulation is extremely undesirable for hygienic considerations, since an ideal growth substrate for bacteria and fungi develops in the mostly warm and frequently moist environment. It has therefore been recognized as absolutely necessary that air ducts for room air must be cleaned. To facilitate cleaning, all gaps, grooves, projections, and in particular projecting parts such as sheet metal screws, rivets, etc., must be avoided.

DE 25 53 720 A1, on which the preamble of claim 1 is based, describes a butt joint between two air duct sections in which the connection flanges are molded in one piece to the ends of the duct sections. They consist essentially of annular edges that project at a right angle from the ends of the channel sections and have outer edges which are angled away from each other by about 10° in reference to the associated annular edge.

A clamp made of spring steel has been clamped to the annular edges at four points, offset from each other on the duct circumference by 90°. The bent, outside edges of the annular edges prevent the clamp from slipping off the annular edges. The disadvantage hereby is that several elastic clamps must be manufactured and installed for a single butt joint. This type of installation does not allow a continuous, complete seal and a good centering of the air duct sections. The contact pressure that can be achieved in this manner between opposing annular edges is much too low for this. The stability of the assembly is also relatively small. Especially for pipes with larger diameters, e.g. about 2,000 mm, neither an adequate centering nor a stable suspension of the pipes can be achieved.

SUMMARY OF THE INVENTION

The invention is therefore based on the objective of improving a butt joint of this type in such a way as to, on the one hand, achieve a cheaper manufacture and installation, and, on the other hand, significantly improve the seal, the smoothness inside the air duct, the centering, and the stability of the air duct.

According to the invention, this objective is realized with the characteristics of claim 1.

By applying and tightening the clamping ring, the clamping legs, and thus also the adjoining annular edges, are pressed against each other with any desired force. Since the annular edges change into the duct wall at a sharp angle, and at the same time are preferably angled by several degrees from the vertical, this results in a continuous, excellent seal of the annular edges which are being pressed against each other. The installation of the clamping ring is very simple and, due to the simultaneous pressing and centering, results in an excellent stability of the butt joint.

The clamping ring may hereby at its abutting or overlapping edges be easily installed onto the connection flanges with a driving fit by using a clamping device known according to the state of the art, i.e. a tension lock, etc. The one-piece construction of duct section and connection flange, the absence of parts of the connection flange that project into the duct, and the essentially depression-free pressing of the annular edges against each other in the area of the abutting duct walls because of the perfect centering results in a sealed air transport and an essentially unhindered flow without any tendencies to contaminations inside the duct. Since, apart from the duct sections themselves, with the connection flanges molded to them in one piece, only a single clamping ring must be manufactured and installed separately, resulting in significant savings for manufacture and installation.

The sealing of the butt joints is significantly simplified. Energy losses and noise formation, as well as any dirt accumulations, are significantly reduced. The cleaning of such an air duct is also facilitated and improved by this. In principle, a good seal can already be achieved by the tight clamping or drawing together of the two annular edges, which can be increased even more by a slight angling of the annular edges in the non-load-bearing state.

The secondary claims refer to advantageous embodiments of the invention. claims 2 and 3 relate to practical embodiments of the connection flange.

According to claim 4, the duct walls can be constructed in a useful manner substantially smoothly in order to avoid internal joints in the duct, as occur more or less inevitably in a folded spiral-seam pipe. This is achieved by locating a single longitudinal welding seam on the inside. According to claim 5, it is however principally also possible to locate the connection flange according to the invention at the end of a folded spiral-seam pipe.

If needed, claim 6 provides that the gap between the two annular edges can be additionally sealed in a very simple manner.

Exemplary embodiments of the invention are described in more detail in reference to the drawings. In the drawings:

DETAILED DESCRIPTION OF THE DRAWINGS

Identical or similar parts have been designated with the same reference numbers in all drawings.

Figure 1:
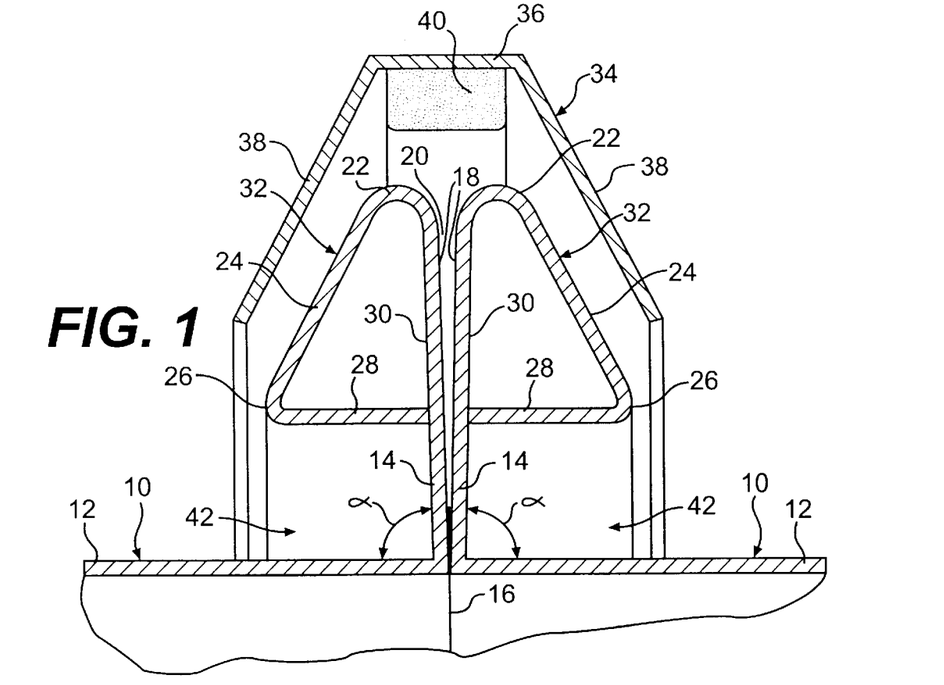
FIG. 1 shows a partial axial section through a butt joint according to the invention prior to the tightening of the clamping ring.
Figure 2:
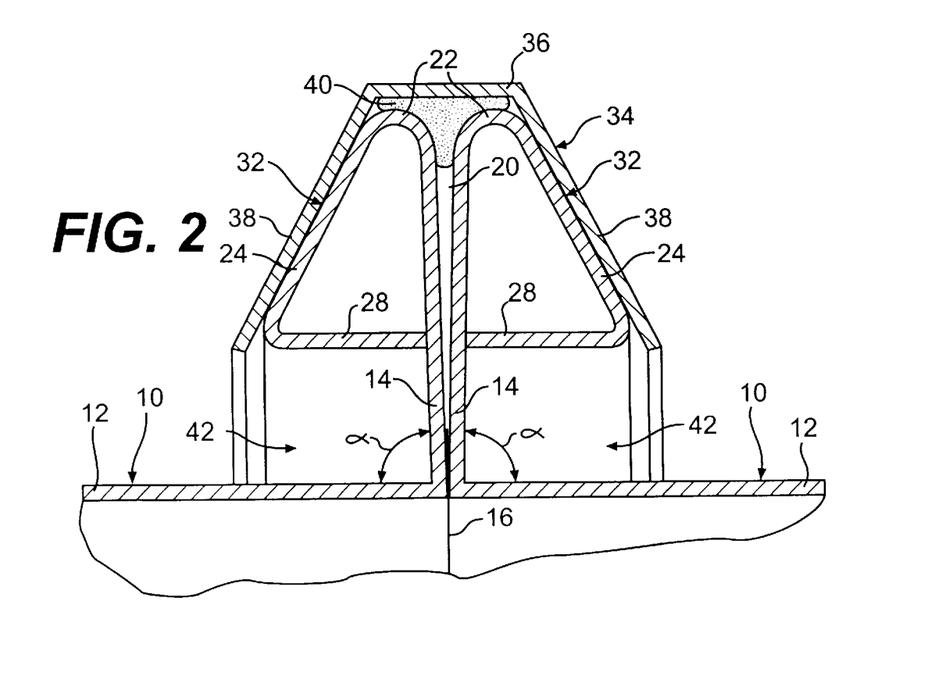
FIG. 2 shows a partial section corresponding to FIG. 1 after the tightening of the clamping ring.

As can be clearly seen from FIGS. 1 and 2, the butt joint shown has two duct sections designated in general with 10 and having a duct wall 12 that has a tubular, preferably circular cross section. At the abutting edges, each duct wall 12 changes as far as possible with a sharp edge into an outwardly projecting annular edge 14 which encloses an angle a of 85° to 89°, preferably 87° to 89°, with the duct wall 12. If the inside ends of the annular edge 14 adjoin each other closely in the area of the duct walls 12 along a narrow partition joint 16, a wedge-shaped gap 20 that expands radially outward is created between the end faces 18 of the two annular edges 14.

The outside end of each annular edge 18 changes via a curvature 22 into a conically angled clamping leg 24 that faces backward and, on the inside, towards the associated duct wall 12. The inner end of each clamping leg 24 that is located close to the duct wall 12 changes via a curvature 26 into a supporting leg 28 that extends at a distance from the duct wall 12 parallel to the same and towards the annular edge 14. The free end of each supporting leg 28 rests in a supporting manner against the side 30 of each annular edge 14 that faces away from the partition joint 16 or the wedge-shaped gap 20. This provides an exceedingly stable construction of the connection flange, as it is called in its entirety, that is formed by the annular edge 14, the clamping leg 24, and supporting leg 28, and that is connected in one piece with the duct wall 12.

The adjoining connection flanges 32 are pulled against each other and have pressure applied to them by placing a generally annular clamping ring 34 with a trough-shaped cross section (FIG. 1) and by tightening the clamping ring 34 (FIG. 2) so that the duct walls 12 are axially pressed against each other even tighter along the joint 16. The tightening of the clamping ring can be achieved in an actually known, but not shown manner, by tightening a nut located on a bent screw which is attached to one clamping ring end, whereby the bent screw extends through a sheath located on the other clamping ring end. This makes it possible to make the connection within seconds by tightening a single screw. An adjustable lever lock or similar device can also fulfill this purpose. In special cases, in which the requirements regarding seal and stability are not quite as high, several grasping screw clips or similar devices can be used instead of the clamping ring 34 as a clamping device for holding together the butt joint.

The clamping ring 34 shown in FIGS. 1 and 2 is equipped with a trough bottom 36 as well as two conical side legs 38 whose conicity corresponds to the conicity of the clamping legs 24 and which therefore press against the clamping legs 24 when the clamping ring 34 is tightened.

In the embodiment shown, there is attached to the inside of the trough bottom 36 a circumferential, strip-shaped elastic seal 40 which, when the clamping ring 34 is tightened, is pressed in a sealing manner into the clamped position shown in FIG. 2, i.e. onto the outside of the curvatures 22 as well as into the outer end of the wedge-shaped gap 20 between the end faces 18 of the annular edge 14. In addition to the good seal along joint 16 achieved by the inner ends of the annular edge 14 being pressed hard against each other, this results in a seal which is adequate for practically all occurring cases.

Between the supporting legs 28 and the duct walls 12, a U-shaped trough 42 is formed towards the annular edges 14. These U-shaped troughs 42 can be used, e.g. for the placement and engagement of screw clamps functioning as clamping devices in the above-mentioned cases, or for inserting clamps for suspending the air duct.

The tight abutment of the ends of the duct walls 12 or the inner ends of the annular edges 14 and the as sharp-edged as possible angle of the annular edges 14 in relation to the duct walls 12 results, as mentioned, in a very narrow butt joint 16, thus preventing flow impairments and effectively preventing accumulations of dirt. For comparison, it must be considered that in known butt joints a 2 to 5 mm wide gap is created between the adjoining duct sections at this point, which is partially filled with porous sealant. Together with the dirt accumulating in the gap, this results in a good growth medium for bacteria, etc.

In order to ensure that the connection flange 32 is clamped well by the clamping ring 34, the clamping legs 24, and thus also the side legs 38, form an angle of preferably about 30° with the annular edges 14. When the clamping ring 34 is clamped, the curvatures 22 of the two connection flanges 32 are at the same time aligned radially by the trough bottom 36 of the clamping ring 34.

Figure 3A:
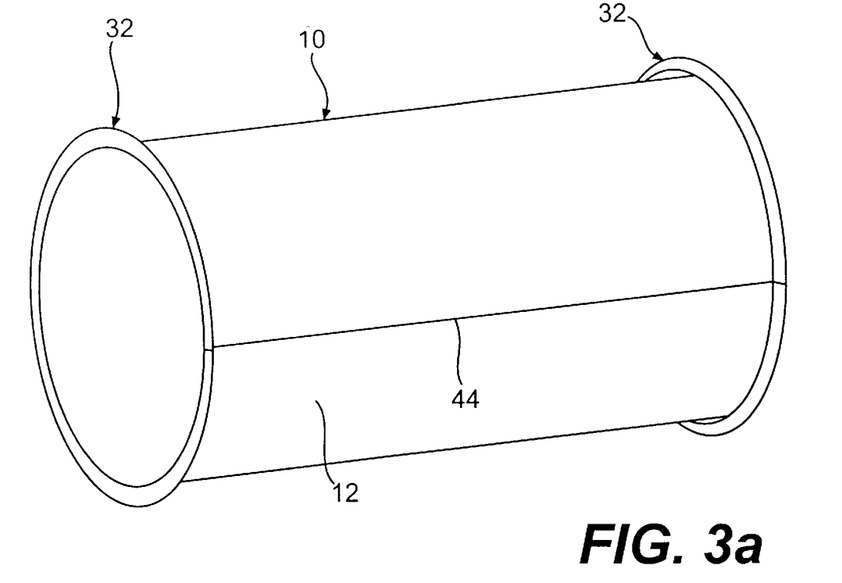
FIG. 3a shows an angled view of a circular air duct section for the butt joint section according to the invention.

FIG. 3 shows a duct channel 10 with a circular cross section used for the butt joint according to the invention, which has at each of both ends a connection flange 32 according to FIGS. 1 and 2. In order to ensure that in the longitudinal direction of the air duct section, at the inside wall of the same, grooves, folded seams or other projecting or sunk sections are created neither in the area of the duct wall 12 nor in the area of the connection flanges 32, the shown air duct section 10 is provided with a longitudinal welding seam 44 which is mostly smooth on the inside surface of the duct wall 12. This also makes the duct suitable for the highest requirements.

Figure 3B:
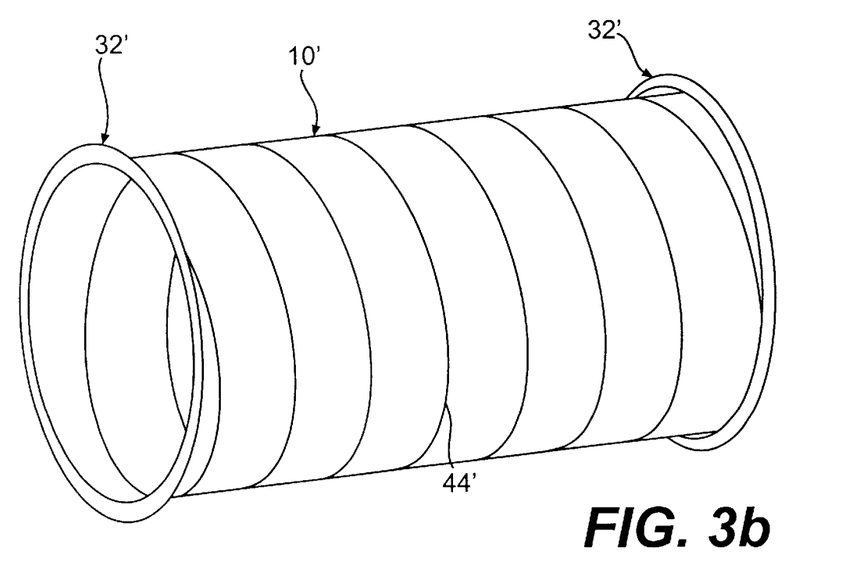
FIG. 3b shows an angled view of a circular air duct section constructed as a folded spiral-seam pipe for the butt joint according to the invention.

A similar duct section 10' is shown in FIG. 3b. This duct section 10' is manufactured as a folded spiral-seam pipe with spiral wound fold 44', not with a longitudinal welding seam. The fine grooves of the folded spiral seam 44' inside the pipe are acceptable for lesser requirements. The main problem points, i.e. projection and gap between the connection flange 32 and the duct wall 12' as well as the gap between the annular edge 14 and the counter-annular edge 14 are eliminated by this in any case.

Figure 4:
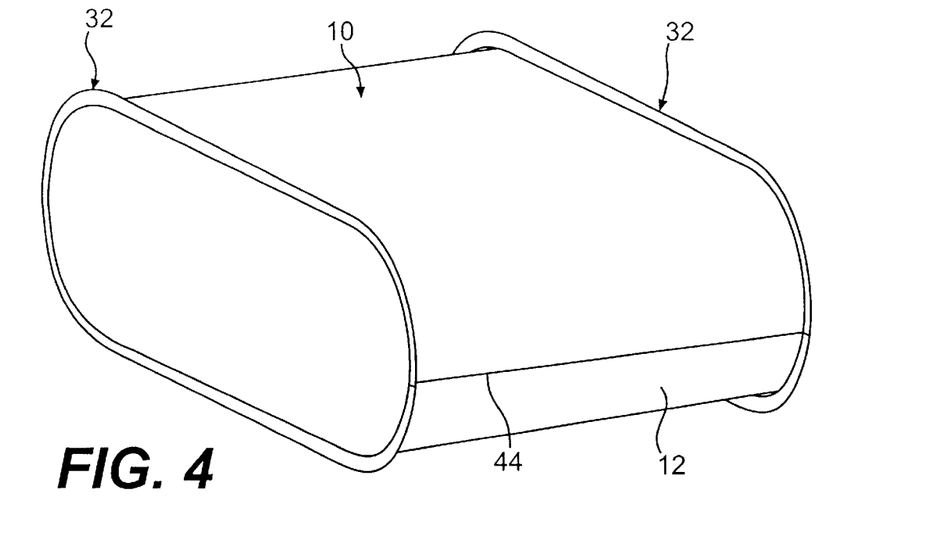
FIG. 4 shows an angled view of a flat, oval air duct section.

A straight duct section 10, which however has a flat, oval cross section and also has a longitudinal welding seam 44, is shown in FIG. 4.

Figure 5:
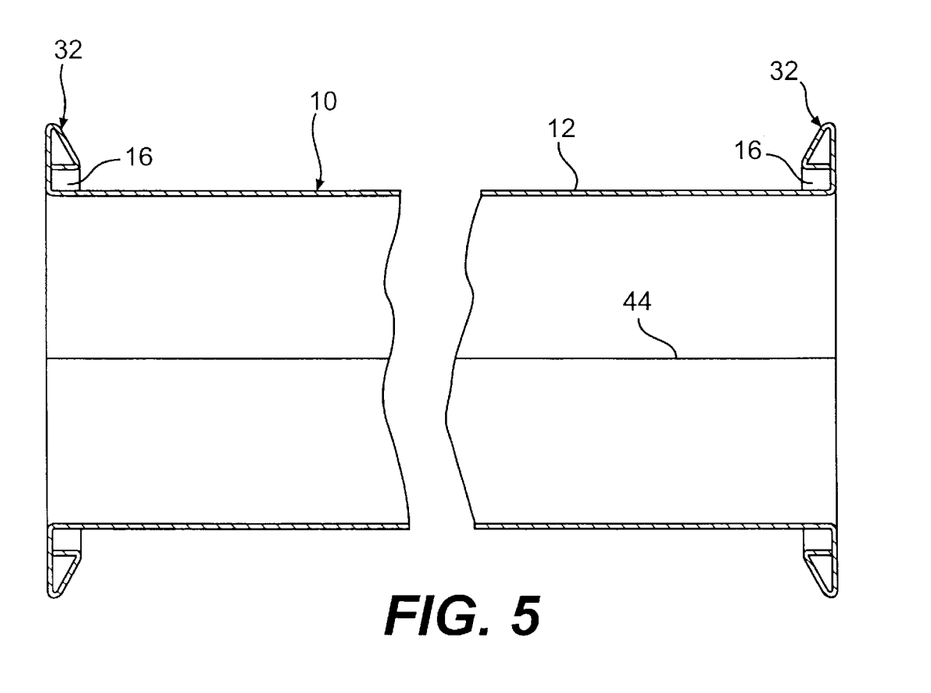
FIG. 5 shows a centered, partial break-away view of an axial section through an air duct section as claimed in claim 3.
Figure 6:
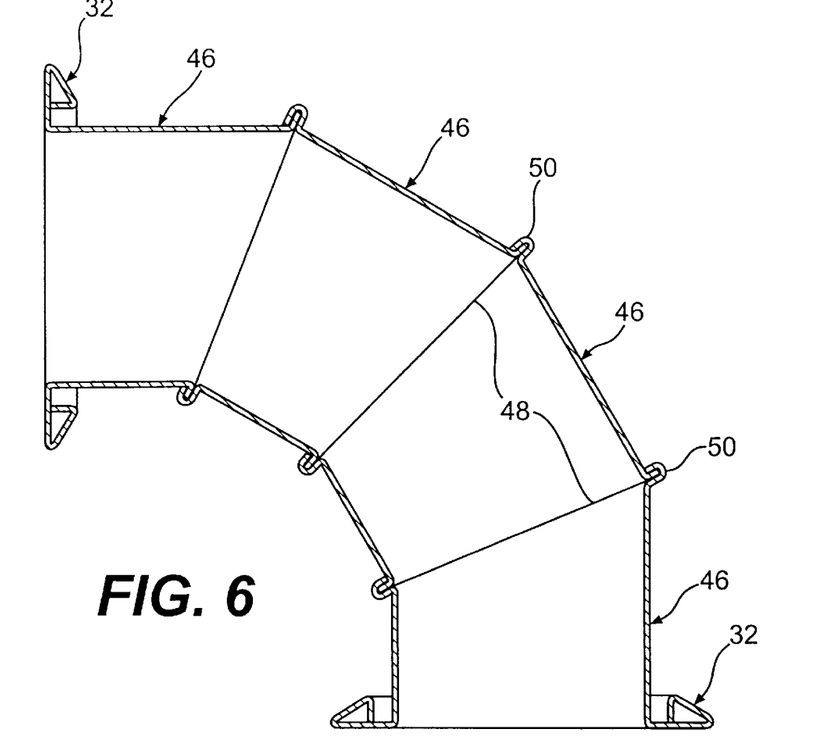
FIG. 6 shows a section of an air duct bend formed by segments with a trapezoid cross section.

The air duct section 10 shown in FIG. 3 is shown in the form of an axial section in FIG. 5. FIG. 6 shows a bend composed of several shaped pieces 46 which all have a trapezoid cross section, where this bend can be connected by means of connection flanges 32 at its ends to adjoining, straight air duct sections 10, as was explained above. The individual shaped pieces 46 are closely connected with each other by means of mechanical or welded partition joints 48 and an outwardly projecting fold 50 as smoothly as possibly.

Figure 7:
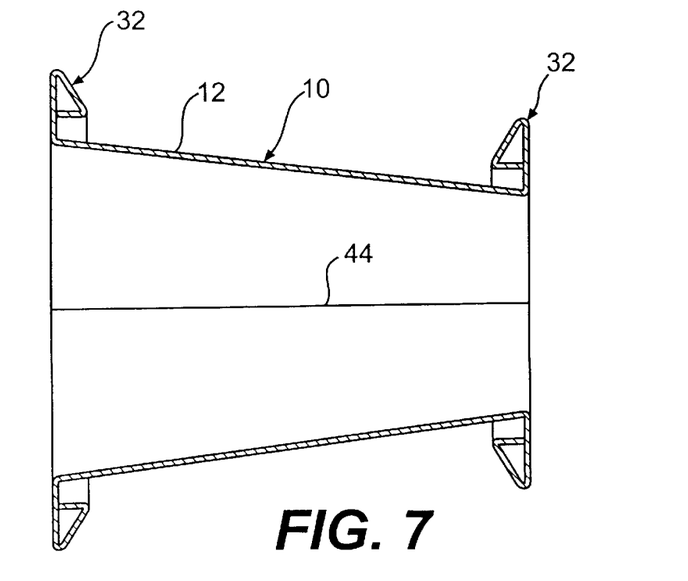
FIG. 7 shows a section of a conical air duct section.
Figure 8:
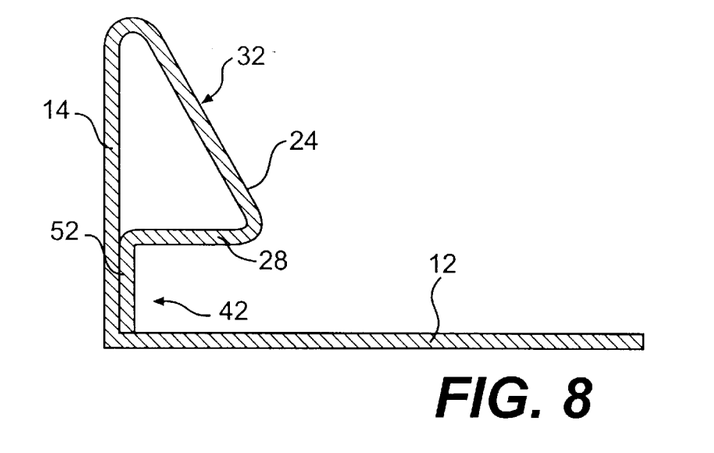
FIGS. 8–13 show various embodiments of connection flanges molded in one piece to a duct wall.

FIG. 7 shows a conically tapered embodiment of an air duct section 10 with connection flanges 32 and longitudinal welding seam 44, whereby the duct wall 12 is conically tapered from one end to the other.

The following FIGS. 8 to 13 show an axial section of various embodiments of connection flanges 32 molded in one piece to the end of the duct wall 12. In the embodiment according to FIG. 8, the approximately radially outward projecting annular edge 14 which, however, encloses the above-mentioned, slightly acute angle a with the duct wall 12, the associated clamping legs 24, and the supporting legs 28 associated again with the latter and extending parallel and at a distance from the duct wall 12 are followed by another supporting leg 52, which extends parallel to the annular edge 24 and rests against it, and where the free end of this supporting leg 52 is being supported on the outside of the duct wall 12. This results in an extraordinarily stable shape of the connection flange 32.

Figure 9:
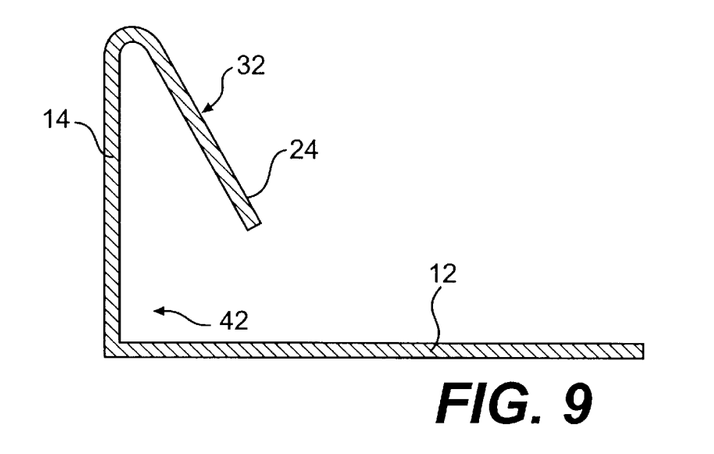

A relatively simple, and to this extent cheap, embodiment of the connection flange 32 is shown in FIG. 9. Apart from the annular edge 14 and the clamping leg 24, this embodiment does not have any other supporting legs. In respect to the stability of the connection flange 32 it is adequate for many cases.

Figure 10:
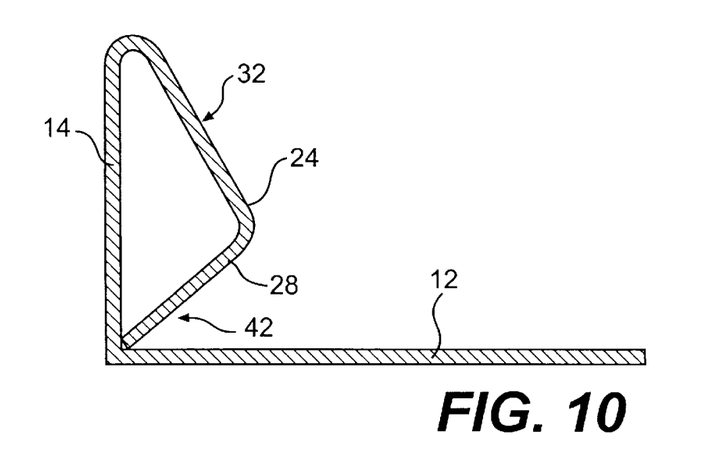

In contrast, FIG. 10 shows an embodiment with a supporting leg 28 which extends from the radially inner end of the clamping leg 24 at an inward angle, and whose free end is supported in the angle between the annular edge 14 and the duct wall 12. In the case of all of these embodiments of the connection flange 32, a trough 42 is also formed, however, in each case with different cross sections, and can be used for the above-mentioned purposes.

Figure 11:
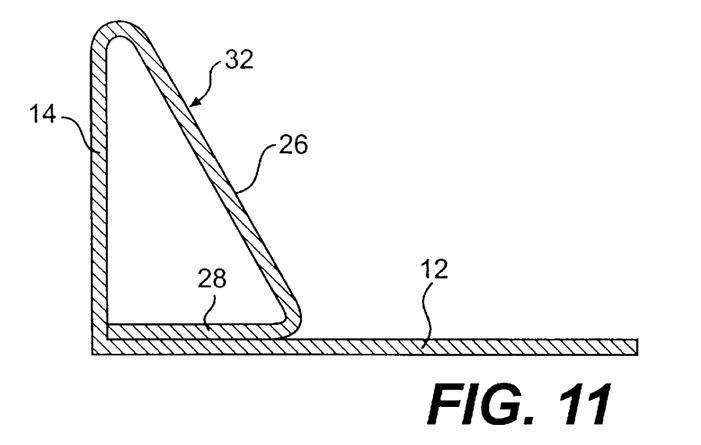

In the embodiment shown in FIG. 11, the supporting leg 28 following the clamping leg 26 also extends parallel to the duct wall 12 and is supported with its free end on the annular edge 14. However, in this embodiment, no trough 42 is provided between the supporting leg 28 and the duct wall 12; instead, the supporting leg 28 rests directly and in a supporting manner against the duct wall 12.

Figure 12:
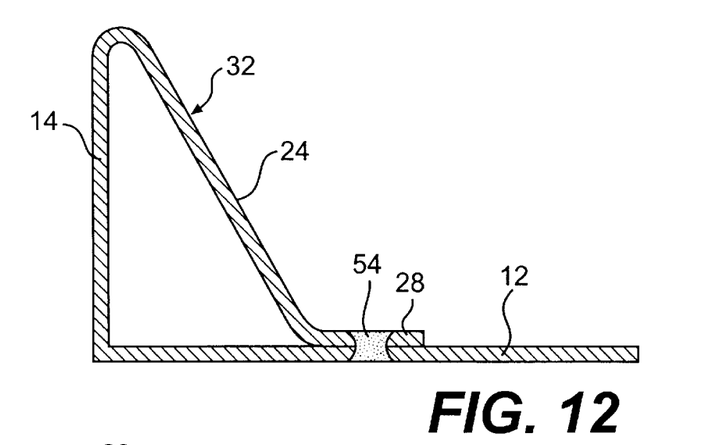

A similar embodiment is shown in FIG. 12. But in this case the supporting leg 28, which also rests against the outside of the duct wall 12, faces away from the annular edge 14. For a better support, it is useful that in this case a point weld 54 is provided between the duct wall 12 and the supporting leg 28.

Figure 13:
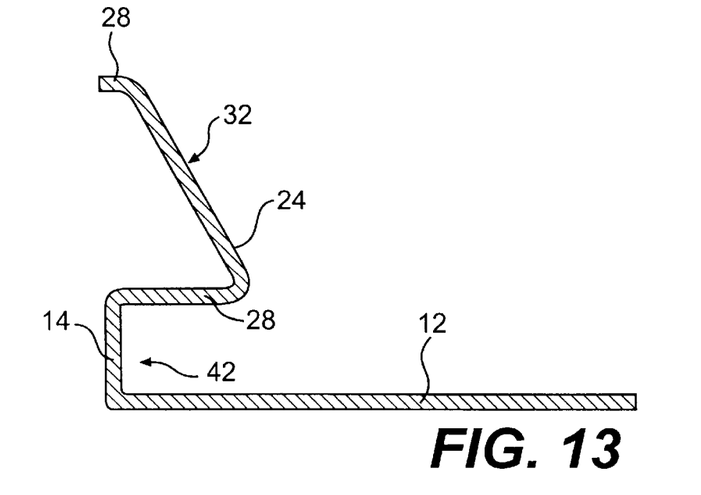

An also relatively easy to manufacture, and thus less stable, embodiment is shown in FIG. 13. The annular edge 14 hereby does not extend outward beyond the entire radial extension of the connection flange 32, but turns into a supporting leg 28 that extends parallel to the duct wall 12, and again changes into the conical clamping leg 24. A second, supporting leg 28 extending parallel to the duct wall 12 is provided at the radially outer end of the clamping leg 24, said supporting leg 28, in a butt joint formed by it with another duct section of this type, comes to rest against a similar supporting leg 28 of the following duct section, whereby this supporting leg faces, however, in the opposite direction.

As required, the contact site between connection flange and duct wall must be sealed. This also requires an exact centering of the abutting duct sections. Because of this, the manufacture of these known butt joints is rather complex. Annular connection flanges must be produced and attached at each duct section, as well as sealed and centered. For plug-in connections, the expenditure is somewhat smaller during manufacture, but greater during installation. The known air ducts also have significant problems with regard to sealing and interference with the air flow in the duct due to projections and projecting parts inside the duct, and also as a result of not being centered. Especially during suction and during the transport of dust, chips, fibers, etc., the sheet metal edges, gaps, and projections inside the duct result in accumulations that can build up and obstruct the duct. When transporting room air, such an accumulation is extremely undesirable for hygienic considerations, since an ideal growth substrate for bacteria and fungi develops in the mostly warm and frequently moist environment. It has therefore been recognized as absolutely necessary that air ducts for room air must be cleaned. To facilitate cleaning, all gaps, grooves, projections, and in particular projecting parts such as sheet metal screws, rivets, etc., must be avoided.

EP-A1-0 287 755, on which the preamble of claim 1 is based, describes a butt joint between two air duct sections in which annular edges projecting outward from the duct wall in one piece with it are provided, whereby onto these annular edges connection flanges as separate parts have been set loosely, each of which connection flanges is provided with clamping legs facing conically backward from the outer end of the latter towards the adjoining duct wall.

The clamping legs are pressed together by the conical side legs of a clamping ring. In these known butt joints, it cannot be excluded that during placement and clamping, the connection flanges become radially offset from the annular edges and become deformed. In particular, it is not possible to achieve an accurate centering of the annular edges, and thus of the adjoining duct sections. The more or less curved transition of the duct sections into the vertically projecting annular edges also results in the formation of annular wedges at the inside duct wall which interfere with the smooth flow inside the channel and which trigger a dust and dirt accumulation. The lack of centering also causes a sunk section of this annular wedge. The seal between annular edges and connection flanges is relatively complicated for the known butt joints, since not only the space between the adjoining annular flanges but also the spaces between the annular flanges and the annular edges must be sealed.

The invention is therefore based on the objective of improving a butt joint of this type in such a way as to, on the one hand, achieve a cheaper manufacture and installation, and, on the other hand, to significantly improve the seal, the smoothness inside the air duct, the centering, and the stability of the air duct.

According to the invention, this objective is realized with the characteristics of claim 1.

By applying and tightening the clamping ring, the clamping legs, and thus also the adjoining annular edges, are pressed against each other with any desired force. Since the annular edges change into the duct wall at a sharp angle, and at the same time are angled, preferably by several degrees from the vertical, this results in a continuous, excellent seal of the annular edges which are being pressed against each other. The installation of the clamping ring is very simple and, due to the simultaneous pressing and centering, results in an excellent stability of the butt joint.

What is claimed is:

1. A butt joint between two sheet metal air duct sections with a duct wall having a circular or oval cross section, comprising:

a connection flange of sheet metal on at least one end of each air duct section for forming the butt point with an abutting air duct section, each connection flange being constructed integrally, in one piece, with an adjoining duct wall, each connection flange having at least one annular edge projecting outward from the adjoining duct wall, said at least one annular edge having a radially inner end and a radially outer end;

a clamping leg projecting conically backward from the radially outer end of the at least one annular edge of each connection flange and directed towards the duct wall integrally adjoining said connecting flange;

a clamping ring having conical side legs mountable on an adjacent pair of connection flanges of abutting air duct sections wherein said radially inner ends of said connection flanges come in direct contact with one another, said conical side legs disposed on corresponding clamping legs of the adjacent pair of connection flanges and holding said adjacent pair of connection flanges together;

characterized in that the at least one annular edge that forms part of the connection flange encloses, together with the adjoining duct wall, in a non-load-bearing state, an angle of 80° to less than 90°, and said at least one annular edge transitions into the duct wall at a sharp angle at its radially inner end.

2. Butt joint as claimed in claim 1, characterized in that the annular edge encloses, in the non-load-bearing state, in each case an angle of 87° to 89° with the duct wall.

3. Butt joint as claimed in claim 1, characterized in that the clamping leg changes at its radially inner end into a supporting leg that rests against the annular edge and/or the duct wall.

4. Butt joint as claimed in claim 1, characterized in that the duct wall in each case has a longitudinal welding seam that is smooth on the inside.

5. Butt joint as claimed in claim 1, characterized in that the duct wall is provided with a spiral wound fold.

6. Butt joint as claimed in claim 1, characterized in that on the inside of the clamping ring an elastic seal that has been pressed into the radially outer end of the wedge-shaped gap between the annular edges is provided.

* * * * *

UNITED STATES PATENT AND TRADEMARK OFFICE
CERTIFICATE OF CORRECTION

PATENT NO.   : 6,109,665

DATED        : 8/29/00

INVENTOR(S)  : MEINIG

It is certified that error appears in the above-identified patent and that said Letters Patent is hereby corrected as shown below:

Assignee's name: Change " METU-System Meining KG" to -- METU-System Meinig KG --.

UNITED STATES PATENT AND TRADEMARK OFFICE
CERTIFICATE OF CORRECTION

PATENT NO. : 6,109,665
DATED : Aug. 29, 2000
INVENTOR(S) : Manfred MEINIG

It is certified that error appears in the above-identified patent and that said Letters Patent is hereby corrected as shown below:

Claim 6, line 3, change "the wedge-shape gap" to

-- a wedge-shape gap- -

Signed and Sealed this

First Day of May, 2001

Attest:

NICHOLAS P. GODICI

*Attesting Officer*  *Acting Director of the United States Patent and Trademark Office*